United States Patent
Teranishi

(10) Patent No.: US 9,548,819 B2
(45) Date of Patent: Jan. 17, 2017

(54) METHOD TO CONTROL OPTICAL RECEIVER IMPLEMENTED WITH SEMICONDUCTOR OPTICAL AMPLIFIER AND METHOD TO CONTROL OPTICAL COMMUNICATION

(71) Applicant: SUMITOMO ELECTRIC DEVICE INNOVATIONS, INC., Yokohama-shi, Kanagawa (JP)

(72) Inventor: Ryota Teranishi, Yokohama (JP)

(73) Assignee: SUMITOMO ELECTRIC DEVICE INNOVATIONS, INC., Yokohama-shi (JP)

( * ) Notice: Subject to any disclaimer, the term of this patent is extended or adjusted under 35 U.S.C. 154(b) by 0 days.

(21) Appl. No.: 14/705,025

(22) Filed: May 6, 2015

(65) Prior Publication Data
US 2015/0236794 A1 Aug. 20, 2015

Related U.S. Application Data

(62) Division of application No. 13/838,564, filed on Mar. 15, 2013, now Pat. No. 9,054,815.

(30) Foreign Application Priority Data

Mar. 16, 2012 (JP) ................. 2012-061024

(51) Int. Cl.
*H04B 10/00* (2013.01)
*H04B 10/60* (2013.01)
*H04B 10/27* (2013.01)

(52) U.S. Cl.
CPC ............. *H04B 10/60* (2013.01); *H04B 10/27* (2013.01)

(58) Field of Classification Search
CPC ... H04B 10/673; H04B 10/2914; H04B 10/67; H04B 10/671; H04B 10/60; H04B 10/27; H04B 10/50575; H04B 10/07955; H04B 10/691; H04L 7/0075; H01S 5/026; H01S 5/2022; H01S 5/0683; H04J 14/0221
(Continued)

(56) References Cited

U.S. PATENT DOCUMENTS 5,029,297 A 7/1991 Halemane et al.
5,185,756 A 2/1993 Olshansky et al.
(Continued)

FOREIGN PATENT DOCUMENTS

JP 59-211339 11/1984
JP 13-198032 A 8/1991
(Continued)

OTHER PUBLICATIONS

Office Action dated Feb. 9, 2016, issued in counterpart Japanese Patent Application No. 2012-061024, with English translalion. (6 pages).

*Primary Examiner* — Hibret Woldekidan
(74) *Attorney, Agent, or Firm* — Westerman, Hattori, Daniels & Adrian, LLP

(57) ABSTRACT

A method to control an optical receiver implemented with a semiconductor optical amplifier (SOA) is disclosed. The SOA has a p-n junction operable in a PD mode when it is supplied with a zero or reverse bias. The SOA detects the magnitude of the incoming light and the driving current supplied thereto is adjusted based on thus detected magnitude of the incoming light such that the outgoing light provided to the PD has a magnitude within a preset range.

10 Claims, 9 Drawing Sheets

(58) Field of Classification Search
USPC ............... 398/140, 160, 162, 157, 208, 209
See application file for complete search history.

(56) References Cited

U.S. PATENT DOCUMENTS

| | | | | |
|---|---|---|---|---|
| 6,026,107 | A * | 2/2000 | Huang | B82Y 20/00 372/105 |
| 6,631,019 | B1 | 10/2003 | Vujkovic-Cvijin et al. | |
| 6,731,424 | B1 * | 5/2004 | Wu | H01S 5/50 359/337.1 |
| 6,862,136 | B2 * | 3/2005 | Koren | H01S 5/5018 359/337.4 |
| 7,339,726 | B2 * | 3/2008 | Fathimulla | G02B 5/122 359/344 |
| 7,343,061 | B2 * | 3/2008 | Forrest | G02B 6/12004 372/50.21 |
| 7,369,583 | B2 * | 5/2008 | Ledentsov | H01S 5/0607 372/102 |
| 7,864,412 | B2 * | 1/2011 | Matsuda | H01S 5/0609 359/336 |
| 8,380,032 | B2 * | 2/2013 | Hasegawa | B82Y 20/00 359/27 |
| 8,736,956 | B2 | 5/2014 | Tanaka et al. | |
| 9,054,815 | B2 * | 6/2015 | Teranishi | H04B 10/671 |
| 2003/0043431 | A1 | 3/2003 | Chand et al. | |
| 2003/0223763 | A1 | 12/2003 | Tanaka | |
| 2005/0117623 | A1 * | 6/2005 | Shchukin | G02B 5/285 372/97 |
| 2005/0254056 | A1 * | 11/2005 | Kachanov | G01J 3/10 356/437 |
| 2006/0221438 | A1 * | 10/2006 | Akiyama | H01S 5/0262 359/344 |
| 2008/0174856 | A1 * | 7/2008 | Matsuda | H01S 5/0609 359/337 |
| 2009/0208227 | A1 | 8/2009 | Yoshida et al. | |
| 2009/0322233 | A1 | 12/2009 | Sone | |
| 2011/0164310 | A1 * | 7/2011 | Tanaka | H01S 5/0612 359/344 |
| 2011/0182591 | A1 | 7/2011 | Ikeuchi et al. | |
| 2011/0206384 | A1 * | 8/2011 | Zhou | H04B 10/572 398/192 |
| 2011/0273765 | A1 * | 11/2011 | Tanaka | B82Y 20/00 359/344 |
| 2013/0257177 | A1 * | 10/2013 | Jacobson | H02M 1/08 307/115 |
| 2013/0301985 | A1 * | 11/2013 | Achouche | G02B 6/12002 385/30 |
| 2014/0376930 | A1 * | 12/2014 | Shiba | H04B 10/671 398/212 |

FOREIGN PATENT DOCUMENTS

| | | |
|---|---|---|
| JP | H5-190988 A | 7/1993 |
| JP | 2001-244885 A | 9/2001 |
| JP | 2003-348021 A | 12/2003 |
| JP | 2010-10614 A | 1/2010 |
| JP | 2011-172202 A | 9/2011 |

* cited by examiner

METHOD TO CONTROL OPTICAL RECEIVER IMPLEMENTED WITH SEMICONDUCTOR OPTICAL AMPLIFIER AND METHOD TO CONTROL OPTICAL COMMUNICATION

CROSS-REFERENCE TO RELATED APPLICATIONS

This application is a Divisional application of U.S. application Ser. No. 13/838,564, filed on Mar. 15, 2013, which is based upon and claims the benefit of priority of the prior Japanese Patent Application No. 2012-061024, filed on Mar. 16, 2012, the entire contents of which are incorporated herein by reference.

BACKGROUND OF THE INVENTION (i) Technical Field

The present application relates to a method to control an optical receiver implemented with a semiconductor optical amplifier (hereafter denoted as "SOA" in upstream of a semiconductor photodiode (hereafter denoted as "PD").

(ii) Related Background Arts

In the optical communication system, an optical signal transmitted from an optical transmitting device is received by an optical receiving device propagating through an optical fiber. For instance, a Japanese Patent Application published as JP-2003-0348021A has disclosed an optical communication system in which the optical signal transmitted from an optical transmitter, propagating in an optical fiber, and finally received by an optical receiver.

The optical receiver often detects the optical signal by a photodiode (hereafter denoted as "PD") after amplifying the optical signal by a semiconductor optical amplifier (hereafter denoted as "SOA") because the optical signal is attenuated during the propagating within the optical fiber. In such an arrangement, the light incoming to the SOA is monitored in the magnitude thereof, and the SOA is controlled in feedback based on the monitoring result.

However, when a portion of incoming light provided from the optical fiber is monitored and the SOA is controlled in feedback by the monitoring results, the rest portion of the incoming light provided from the optical fiber and entering the "SOA" is inevitably diminished, which lowers the magnitude of the outgoing light, degrades the noise figure (NF) or the preciseness of the signal detection by the PD, and so on.

SUMMARY OF THE INVENTION

An aspect of the present application relates to a method to control an optical receiver. The method includes steps of: (1) detecting a magnitude of light incoming to the SOA by operating the SOA in a PD mode; and (2) driving the SOA by supplying a current based on the detected by the SOA. Because the SOA shows an amplifying function to supply a current by forwardly biasing a p-n junction inherently provided in the SOA. However, when the SOA, in particular, the p-n junction thereof is reversely biased or supplied with zero current, the p-n junction may generate a photocurrent depending on the magnitude of the incoming light entering the SOA. Thus, the SOA itself may be replaced to or show a function of a photodiode to monitor the magnitude of the incoming light. Adjusting the forward bias current, based on thus detected magnitude of the incoming light, such that the outgoing light provided from the SOA to the PD has a magnitude adequate to the PD; the optical receiver is operated in optimum to suppress the degradation of the conversion from optical to electrical.

Another aspect of the present application relates to a method to control an optical communication between an optical transmitter and an optical receiver, where they are coupled through an optical fiber. The optical receiver includes an SOA in upstream of a PD. The method includes steps of: (1) operating the SOA in the optical receiver in the PD mode to generate a photocurrent as it receives incoming light provided from the optical transmitter through the optical fiber; (2) evaluating the magnitude of the incoming light; and (3) supplying a driving current to the SOA, where the driving current has a strength determined such that the outgoing light provided from the SOA to the PD has a magnitude within a preset range, namely, optimum for the PD to convert the optical signal into an electrical signal.

Still another aspect of the present application also related to a method to control an optical communication between an optical transmitter and an optical receiver, where they are optically coupled with an optical fiber. The optical provides an SOA in upstream of a PD. The method includes steps of: (1) receiving incoming light provided from the optical transmitter through the optical fiber and the SOA by the PD; (2) determining the magnitude of a driving current supplied to the SOA such that the PD generates a photocurrent within a preset range; and (3) maintaining the driving current during the subsequent optical communication.

The determination of the driving current includes steps of, first supplying a zero current to the SOA and subsequently increasing the driving current by a unit current until the photocurrent generated by the PD falls within the preset range. The unit current is kept constant for the step of the determination, or it may be variable for the step of the determination.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF PREFERRED EMBODIMENTS

Figure 1:
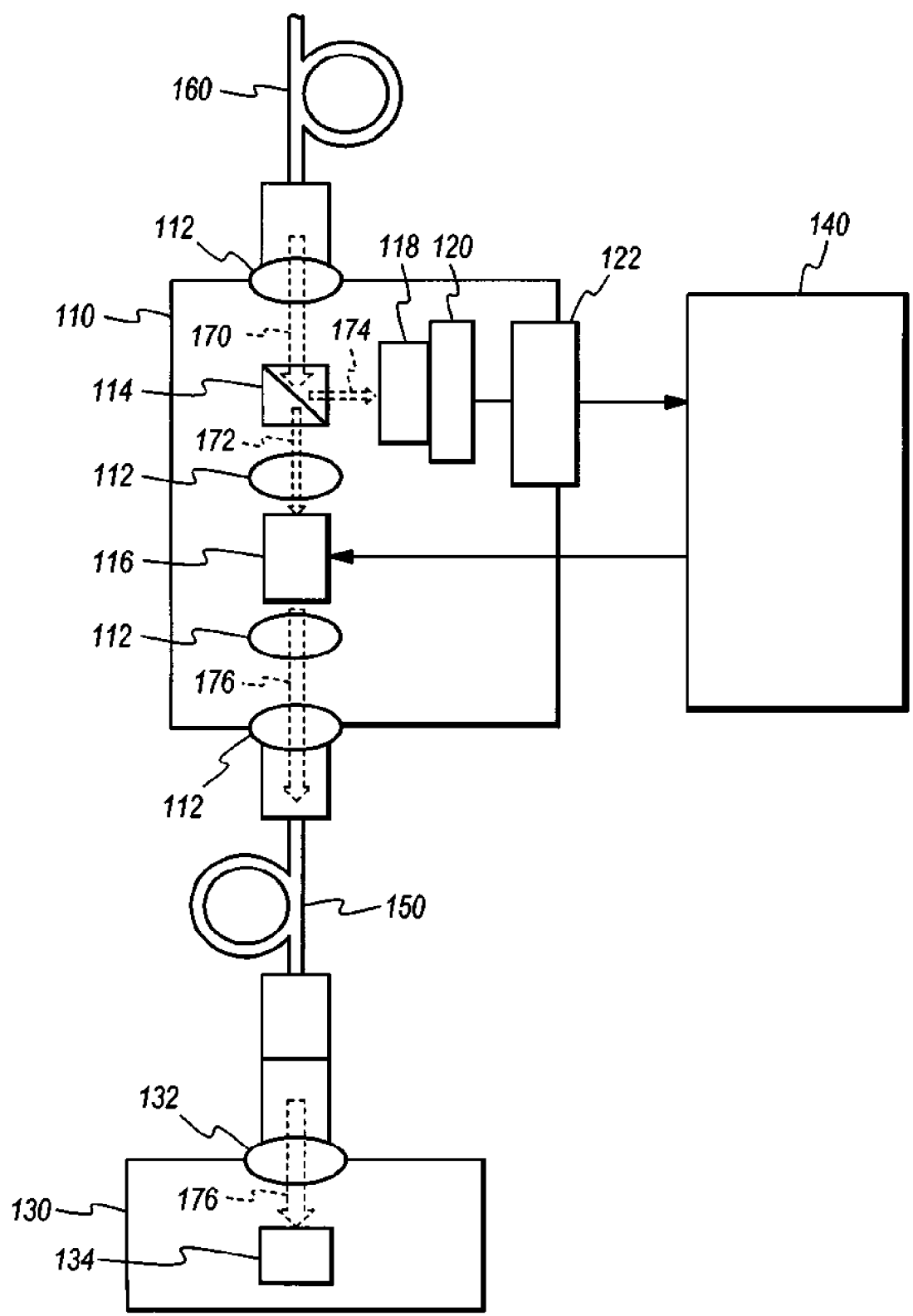
FIG. 1 shows a functional block diagram of an optical receiver comparable to an optical receiver of the present invention.

An optical receiver according to a comparable embodiment will be first described. FIG. 1 schematically illustrates a functional block diagram of an optical receiver according to a comparable example. The optical receiver shown in FIG. 1 primarily includes an SOA module 110, a PD module 130, and a controller 140. The SOA module 110 includes a lens 112, a beam splitter 114, an SOA element 116, and a monitor PD 118. The PD module 130 includes a lens 132 and a PD 134. Two modules, 110 and 130, are coupled with an optical fiber 150.

The lenses, 112 and 132, are the type of the collimating lens. The SOA module 110 also couples with an external optical fiber 160 to transmit light therethrough. The light 170 provided from the optical fiber 160 enters the beam splitter 170 at which the light 170 is divided into two portions. One of the portions 172 of the light 170 enters the SOA element 116; while, the other portion 174 enters the monitor PD 118.

The SOA element 116 amplifies the light 172 split by the beam splitter 114. The light 176 output from the SOA element 116 is received by the PD 134 in the PD module 130 transmitted through the optical fiber 150. The monitor PD 118 and the PD 134 convert the received light into a corresponding photocurrent.

The controller 140 includes a central processing unit (CPU), a random access memory (RAM), a read only memory (ROM), and so on. The controller 140 activates the SOA element 116 by providing the driving current thereto based on the photocurrent output from the monitor PD 118. Thus, the SOA element 116, the monitor PD 118 and the controller 140 constitute a feedback loop to drive the SOA element 116.

The external optical fiber 160 attenuates the intensity of the light propagating therethrough; accordingly, the SOA element 116 placed in upstream of the PD module 130 is preferably to amplify the attenuated light provided from the external optical fiber 160. However, the attenuation strongly depends on the distance of the transmission; and the intensity of the light entering the SOA element 116 widely varies. In a case where the SOA element 116 is driven by a constant driving current, the intensity of the light output from the SOA element 116 sometimes becomes out of range to be detected stably of the PD 134. In an exceptional case, the SOA element 116 amplifies the light with excessive intensity; the eye diagram of the photocurrent output from the PD 134 degrades due to, what is called, the pattern effect. Thus, it is preferable to monitor the intensity of the light entering the SOA element 116, and controls the SOA element 116, in particular adjusts the driving current provided to the SOA element 116 depending on the monitored intensity.

However, the comparable example shown in FIG. 1 provides the beam splitter 114 in the upstream of the SOA element 116 to monitor the magnitude of the incoming light by the monitor PD 118. Then, the magnitude of the light practically entering the SOA element 116 is lowered. When the external optical fiber 160 has a length, for instance, 10 to 40 km for the long reach transmission, the light provided from the optical fiber 160 becomes faint. When the beam splitter 114 splits the light under such a situation, the light entering the SOA element 116 has further attenuated. The feedback control using the monitor PD 118 and the controller 140 becomes insufficient to keep the accuracy of the detection at the PD 134.

Moreover, the feedback control using the monitor PD 118 requires the beam splitter 114, the PD carrier 120, the circuit board 122 for the monitor PD 118, and so on; the SOA module 110 is necessary to secure the space to install those components which makes it hard to form the SOA module 110 in compact. The feedback control of the SOA element 116 without implementing with the monitor PD is required.

Figure 2:
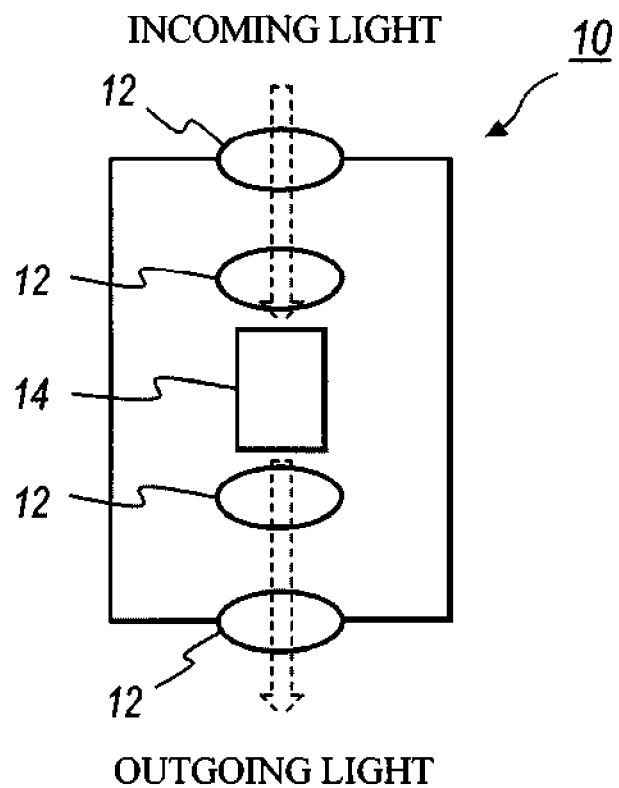
FIG. 2 schematically shows a setup to investigate fundamental characteristics of an SOA.

Experiments performed by the inventor will be first described. The inventor has been aware that, although an SOA operates as an amplifier when it is forwardly biased, an SOA may operate as a photodiode under a reverse bias condition because an SOA is intrinsically a device including the pn-junction as an active layer. FIG. 2 schematically illustrates an SOA module 10 used in the experiment. The SOA module 10 includes lenses 12 to collimate and/or concentrate light, and an SOA element 14. The SOA element 14 includes, on an n-type InP substrate, n-type InP cladding layer, an active region of a type of the multiple quantum well (MQW) structure comprising a plurality of InGaAsP well layers and a plurality of InGaAsP barrier layers alternately stacked to each other, and a p-type InP cladding layer. The inventor detected a photocurrent output from the SOA element 14 when it is reversely biased and illuminated by the incoming light.

Figure 3A:
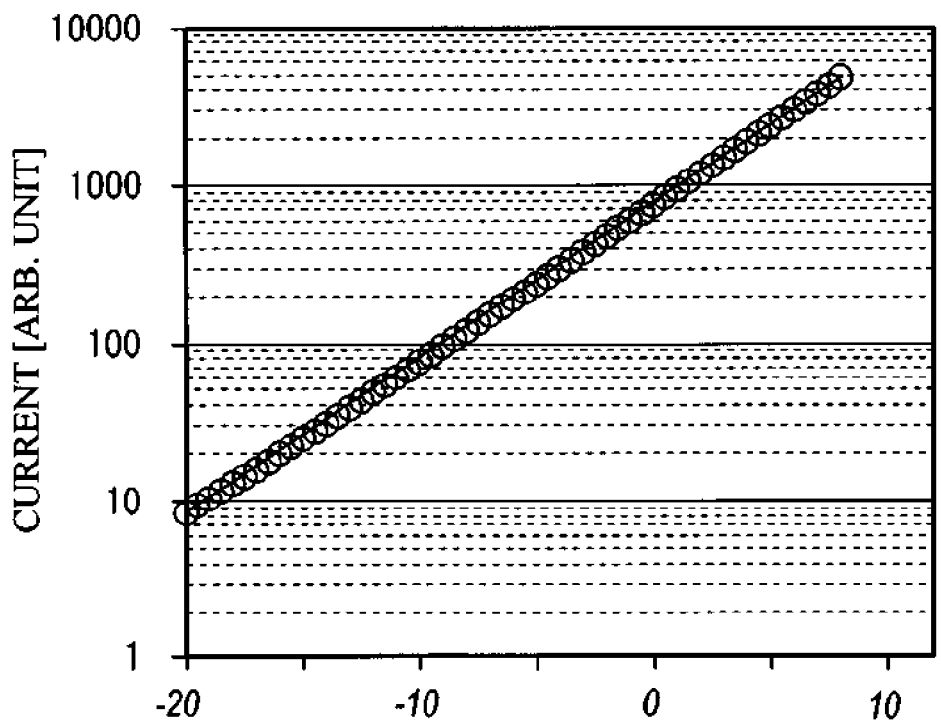
FIG. 3A shows a behavior of a photocurrent against a magnitude of light incoming to an SOA.
Figure 3B:
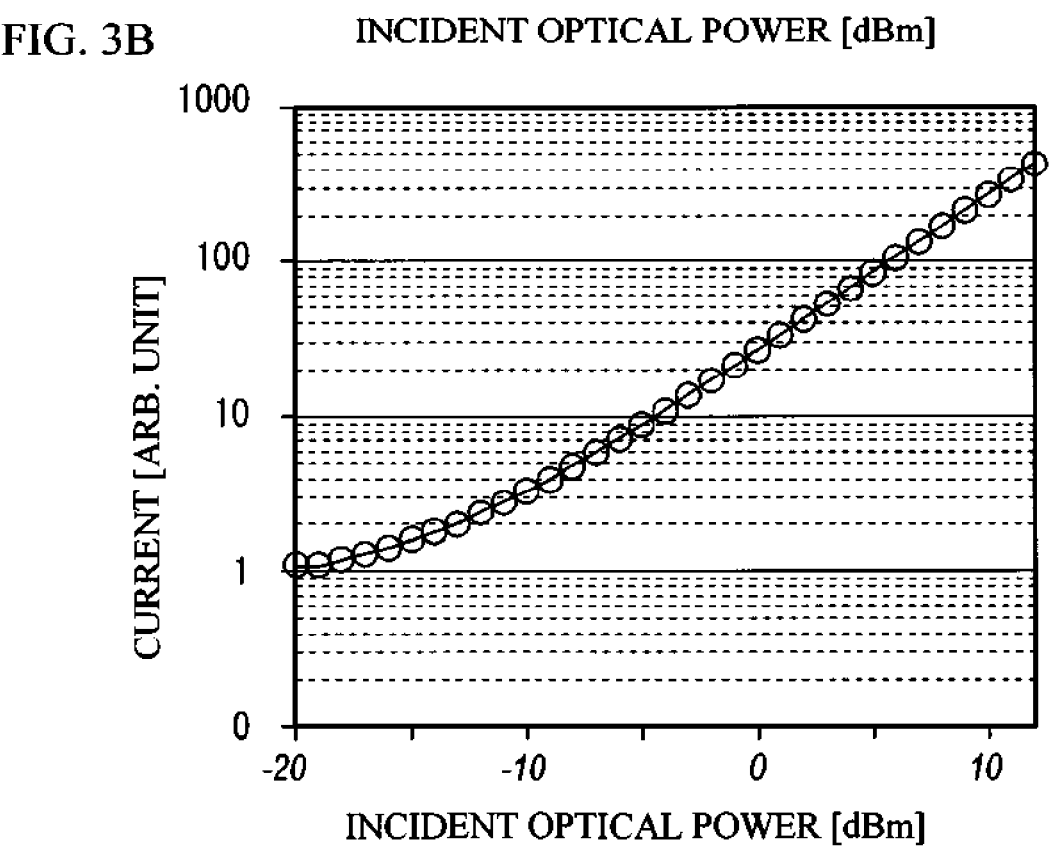
FIG. 3B shows a behavior same to that of FIG. 3A but the photocurrent is generated by a monitoring PD.

FIG. 3A shows the photocurrent output from the SOA element 14 against the magnitude of the incoming light; while, FIG. 3B shows the photocurrent output from the monitor PD 118 against the magnitude of the light input to the SOA module 110 in the comparable example shown in FIG. 1.

As shown in FIG. 3A, illuminating the reversely biased SOA element 14 by the incoming light, the SOA element 14 generates the photocurrent, and the behavior of the photocurrent in FIG. 3A is similar to that output from the monitor PD 118. This means that the SOA element 14, when it is reversely biased, may be operable as a photodiode.

Figure 4:
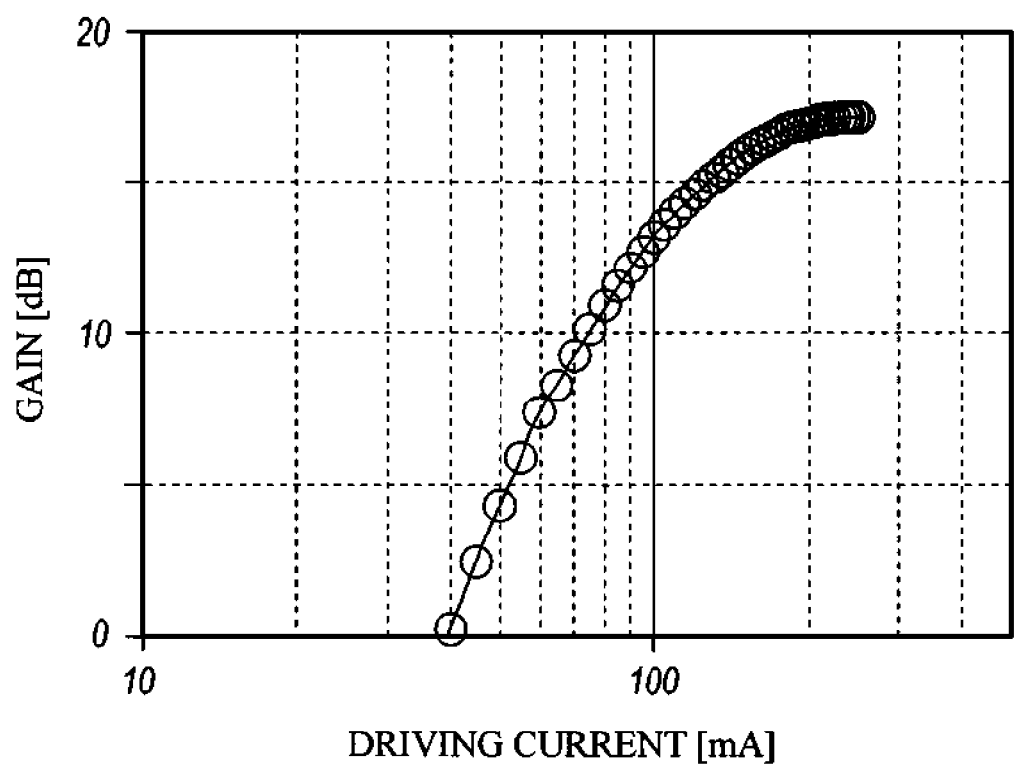
FIG. 4 shows a behavior of an optical gain of an SOA against a magnitude of light incoming thereto.

The SOA element 14 is intrinsically a device to amplify photons when it is forwardly biased. FIG. 4 shows the optical gain attributed to the SOA element 14 against the driving current supplied thereto. Increasing the driving current, the optical gain achieved by the SOA element 14 increases. The experiment thus described suggests that, a time-sharing process, the SOA element 14 first monitors the magnitude of the incoming light by being supplied with a reverse bias; then, the SOA element 14 is supplied with a driving current whose magnitude depends on the monitored result may optimize the operation of the SOA module without any monitoring PDs independent of the SOA.

First Embodiment

Figure 5:
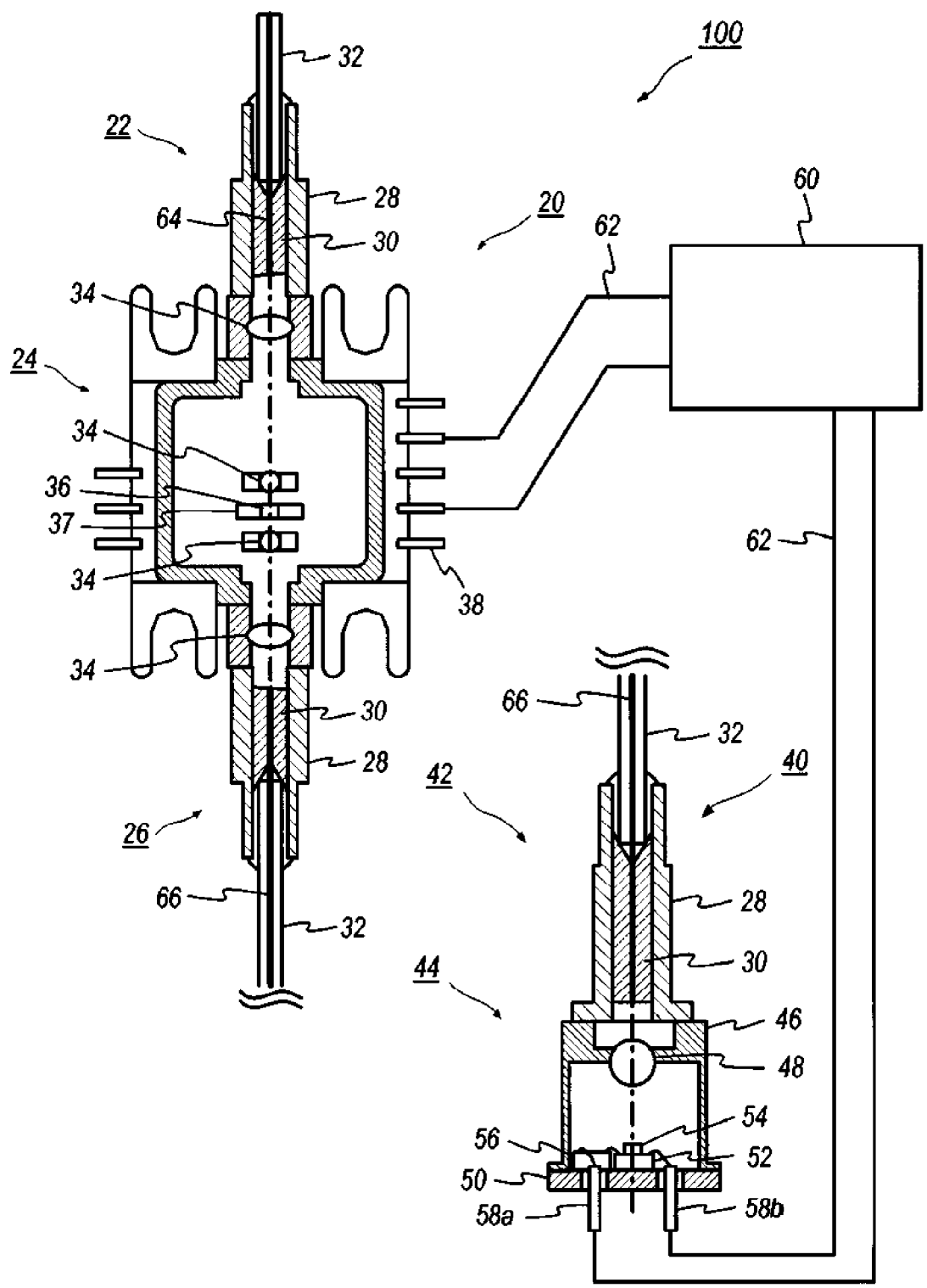
FIG. 5 schematically shows an optical receiver according to an embodiment of the present invention.

FIG. 5 schematically illustrates an optical receiver according to the first embodiment of the invention. The optical receiver 100 primarily comprises an SOA module 20, a PD module 40, and a controller 60. The SOA module 20 includes an input coupling unit 22, an amplifying unit 24, and an output coupling unit 26. The incoming light input to the input coupling unit 22 is amplified in the amplifying unit 24 and output from the output coupling unit 26.

The input coupling unit 22 and the output coupling unit 26 each provides a ferrule 30 set within a sleeve 28, and the ferrule 30 secures the optical fibers, 64 and 66, in a center thereof. The optical fibers, 64 and 66, are covered with a sheath 32 in a portion exposed from the ferrule 30.

The amplifying unit 24 installs lenses 34 and the SOA element 36 therein. The lenses 34, which collimates or concentrates light, are positioned such that optical axes thereof are aligned with the optical axis of the fibers, 64 and 66. The SOA element 36, mounted on a carrier 37, is electrically coupled with lead terminals 38 by bonding wires or elements equivalent thereto, which are not explicitly appeared in figures. The SOA element 36 has an arrangement of, sequentially stacked on an n-type InP substrate, an n-type InP cladding layer, an active layer with the MQW structure including a plurality of InGaAsP well layers and a plurality of InGaAsP barrier layers alternately stacked to each other, and a p-type InP cladding layer. The SOA element 36 operates not only as an optically amplifying device but as a photodiode. The SOA element 36 in a temperature thereof is preferably controlled by, for instance, a thermo-electric cooler (TEC). Also, a temperature sensor, typically a thermistor, is preferably arranged close to the SOA element 36 to sense a temperature of the SOA element 36.

The PD module 40 includes an input coupling unit 42 and an optical device 44. Light input to the input coupling unit 42 is detected in the optical device 44. The input coupling unit 42, similar to those attributed to the SOA module 20, provides the ferrule 30 set within the sleeve 28. An optical fiber 66 is secured in a center of the ferrule 30.

The optical device 44 includes a cap 46 and a stem 50. The cap 46 provides a lens 48 in a ceiling thereof. The cap 46 is assembled with the stem 50 such that the lens 48 in an optical axis thereof is aligned with the optical axis of the fiber 66. The lens 48 concentrates light provided from the optical fiber 66. The stem 50 mounts the PD 54 as putting a carrier 52 therebetween. The PD 54 is electrically coupled with a pre-amplifier 56 and a lead terminal 58b, with bonding wires, while, the pre-amplifier 56 is electrically coupled with the other lead terminal 58a. The lead terminals, 58a and 58b, are electrically isolated from the stem 50 with, for instance, seal glass, ceramics, and so on. The PD 54 converts the light incoming from the optical fiber 66 and concentrated by the lens 48 into a photocurrent and provides this photocurrent to the pre-amplifier 56, while, the pre-amplifier 56 converts this photocurrent into a voltage signal and amplifies the voltage signal.

The optical receiver 100 preferably installs a wavelength filter between the lens 34 and the PD 54 to eliminate optical noises, or an optical isolator to prevent light reflected at a surface of the PD 54 from returning the fiber 66. FIG. 5 omits the filter and/or the optical isolator. These devices of the filter and the optical isolator reduce the optical noises effectively, which suppresses the degradation in the performance of the optical receiver 100.

The SOA module 20 is operable as an optical pre-amplifier put in the upstream of the PD module 40. Accordingly, the optical fiber 66 coupling the SOA module 20 with the PD module 40 has a length of, typically, one meter or less. The light output from the SOA module 20 enters the PD module 40 without substantial loss. Although the embodiment shown in FIG. 5, in particular, the output coupling unit 26 of the SOA module 20 and the input coupling unit 42 of the PD module 40, has an arrangement of, what is called, a pig-tailed coupling where the fiber 66 is permanently fixed to the modules, 20 and 40. However, the output coupling unit 26 and the input coupling unit 42 are able to have the optical coupling by optical connectors.

The controller 60, which includes a central processing unit (CPU), a random access memory (RAM), a read only memory (ROM), and so on, is electrically coupled with the SOA module 20 and the PD module 40 through lead terminals 38, other lead terminals, 58a and 58b, and interconnections 62. The controller 60 provides the driving current to the SOA element 36 in the SOA module 20 to adjust the optical gain thereof. The controller 60 also provides a reverse bias to the SOA element 36 to operate the SOA element 36 as a light-sensing device, namely, a photodiode. The controller 60 receives the photocurrent output from the SOA element 36 when it is operated in the PD mode. The controller 60 also receives another photocurrent output from the PD 54 in the PD module 40.

Figure 6:
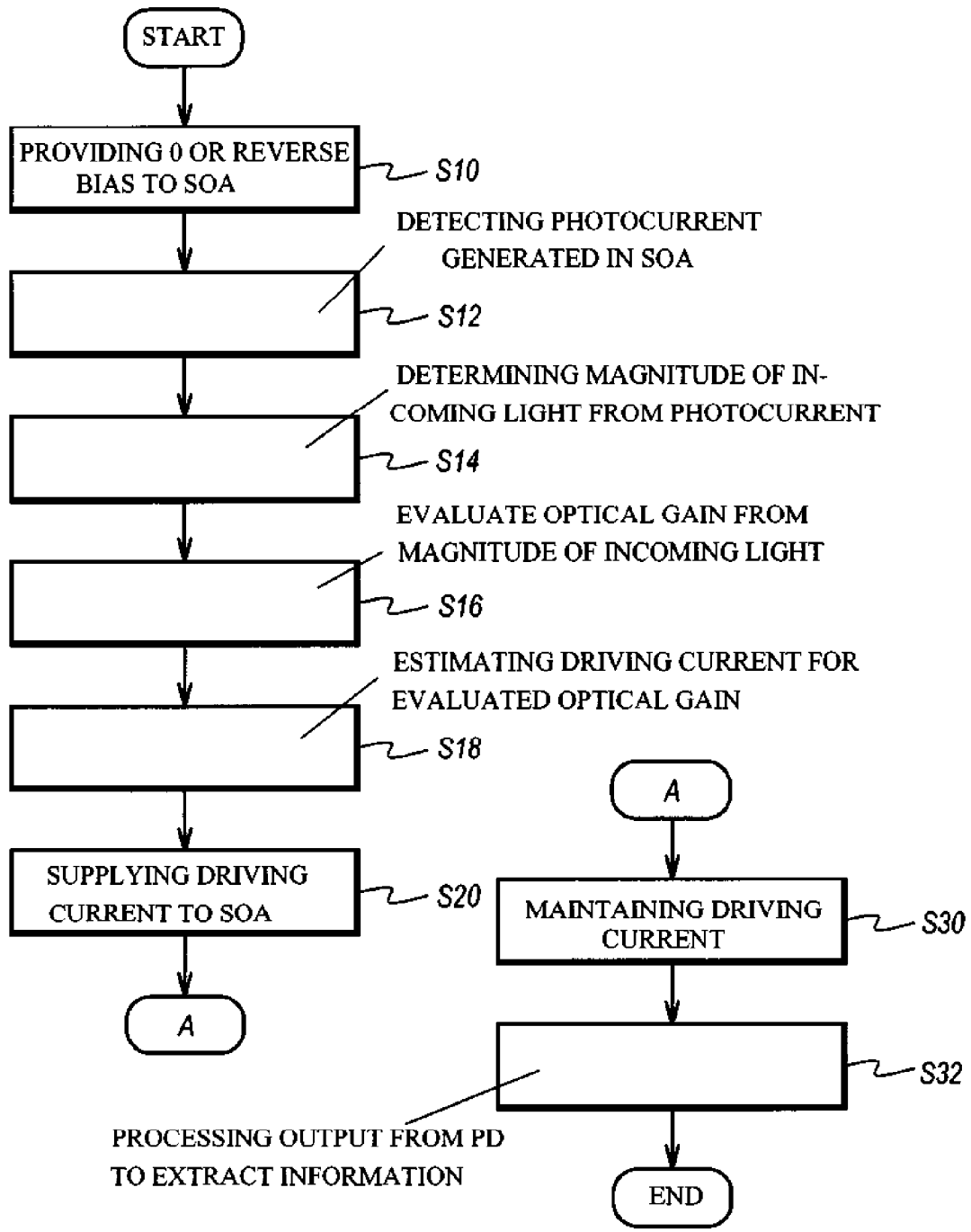
FIG. 6 is a flow chart to control the optical receiver shown in FIG. 5.

The operation of the optical receiver 100 according to the first embodiment of the invention will be described. FIG. 6 is a flowchart showing an operation of the optical receiver 100. The operation first executes an initialization. The initialization process illuminates the SOA module 20 with incoming light output from an optical transmitter, which is not shown in the figures. The light incoming from the transmitter has a magnitude substantially same as that output from the transmitter in a practical communication, or the light incoming from the transmitter in the initialization may be independent of modulation.

In addition, the controller 60 prepares in advance to the initialization the first table that correlates the magnitude of the light incoming to the SOA element 36 against the photocurrent generated thereby, and the second table that correlates the optical gain of the SOA element 36 against the driving current supplied thereto. The first table, which corresponds to the behavior shown in FIG. 3A, is available by measuring the photocurrent against the magnitude of the light practically for the SOA element 36 in advance to the practical communication. Similarly, the second table is available by measuring the characteristic shown in FIG. 4 for the SOA element 36 also in advance to the practical communication.

The initialization corresponds to steps from S10 to S20 shown in FIG. 6. That is, the controller 60 supplies a zero or reverse bias to the SOA element 36 at step S10 as the SOA element 36 is illuminated by the incoming light from the transmitter through the optical fiber 64, which operates the SOA element 36 in the PD mode.

The SOA element 36 generates a photocurrent depending on the magnitude of the incoming light. The controller 60 monitors this photocurrent at step S12. In an example, the controller 60 monitors the photocurrent of 30 $\mu$A, decides the magnitude of the incoming light to be −15 dBm by referring to the first table, then, evaluates the target optical gain of the SOA element 36 based on thus determined magnitude at step S16. The magnitude of the outgoing light from the SOA element 36 is generally defined by a specification; accordingly, the controller 60 may evaluate the target optical gain based on the magnitude of the incoming light thus calculated and the specified magnitude of the outgoing light. For instance, when the target magnitude of the outgoing light is 0 dBm and that of the incoming light is −15 dBm, the optical gain necessary for the SOA element 36 is calculated to be 15 dB.

The controller 60 next evaluates the driving current by referring to the second table based on thus calculated the optical gain at step S18. For instance, FIG. 4, which is reflected in the second table, the driving current for obtaining the optical gain of 15 dB is given by 120 mA. The controller 60 supplies this driving current to the SOA element 36 at step S20. Then, the SOA element 36 operates as an optical amplifier to generate the outgoing light with the target magnitude. The SOA element 36 is supplied with the driving current of 120 mA, then, the outgoing light has the magnitude of 0 dBm.

The optical receiver 100 proceeds the communication of steps S30 and S32 shown in FIG. 6. In step S30, the controller 60 keeps the driving current supplied to the SOA element 36 in a value determined in step S18. In the communication, the light incoming from the optical fiber 64 including information to be transmitted enters the SOA element 36. Because the SOA element 36 operates as an optical amplifier by being supplied with the driving current, the SOA element 36 may amplify this incoming light to emit outgoing light with the predetermined magnitude. The PD 54 receives this outgoing light and generates the photocurrent containing information to be processed. The controller 60 processes this photocurrent to extract the information at step S32. Thus, the optical communication is carried out.

In the communication, the SOA element 36 adequately amplifies the incoming light supplied with the driving current whose amplitude is predetermined in advance to the practical communication. The outgoing light from the SOA element 36 is received by the PD 54 to recover the information contained therein. When conditions of the incoming light due to, for instance, the transmitter are changed in a distance from the optical receiver 100, or in performance thereof, and so on, the optical receiver 100 may rearrange the initialization to decide the driving current newly.

Thus, the first embodiment detects the magnitude of the incoming light by the SOA element 36 and determines the driving current supplied to the SOA element 36, which enables to operate the SOA element 36 substantially in feedback mode without using any monitor PDs. When a specific monitor PD is used as the comparable example shown in FIG. 1, an optical beam splitter is necessary to divide incoming light, which weakens the magnitude of light entering the SOA element 36 and degrades the quality of the outgoing light output from the SOA element 36. On the other hand, the first embodiment thus described omits the monitor PD and detects the magnitude of the incoming light by the SOA element 36, which suppresses the degradation of the quality and the noise figure of the outgoing light, and enhances the total quality of the optical receiver 100.

Moreover, the SOA element 36 may detect the whole portion of the incoming light, which enhances the accuracy of the detected magnitude of the light. While, the comparable example detects a divided portion of the incoming light, which may probably degrade the detection accuracy. The first embodiment may make the optical receiver 100 in compact because some optical components, such as the beam splitter, the PD carrier, and the substrate to interconnect the PD, are omitted.

The optical communication generally utilizes wavelength bands of 1.3 μm and 1.5 μm. The light whose wavelengths are in the 1.3 μm band, although it superior in a viewpoint from the wavelength dispersion, inherently shows a greater optical loss within an optical fiber. That is, the optical receiver 100 shown in FIG. 6 receives the incoming light by the SOA element 36 with less magnitude when the incoming light has the wavelength in 1.3 μm band. Then, the arrangement according to the present embodiment, that is, the incoming light in the magnitude thereof is detected by the SOA element 36, becomes further effective when the optical receiver 100 is applied to the communication in 1.3 μm wavelength band.

Although the first embodiment, as described in FIG. 6, detects the magnitude of the incoming light by the first table based on the photocurrent generated by the SOA element 36, and derives the driving current to get the optimum optical gain by the second table. However, an embodiment may merge the first table into the second table, or, may derive equations corresponding to behaviors shown in FIG. 3A and FIG. 4 without using tables. Key features according to the present invention are to detect the magnitude of the incoming light by the SOA element 36, and to derive the driving current based on thus detected magnitude.

The initialization described in FIG. 6 is preferable done at the starting of the optical receiver 100. The magnitude of the incoming light entering the SOA element 36 strongly depends on a length of the optical fiber 64, namely, a distance from the optical receiver 100 to an optical transmitter; accordingly, once the optical transmitter is set, the distance thereto or the length of the optical fiber is kept during the practical operation of the optical receiver 100. In a modification, the initialization to determine the driving current may be intermittently done during breaks of the communication, or in an especial arrangement, the initialization may be performed during the communication.

The first embodiment provides the optical fiber 66 connecting the SOA module 20 with the PD module 40 with a length of, for instance, shorter than 1 m. However, the optical receiver 100 may provide the optical fiber 66 longer than 1 m. A longer optical fiber possibly weakens the magnitude of the outgoing light output from the amplifying unit 24. Thus, the optical fiber 66 preferably has a length shorter than 1 m, or further preferably shorter than 0.5 m.

Second Embodiment

Figure 7:
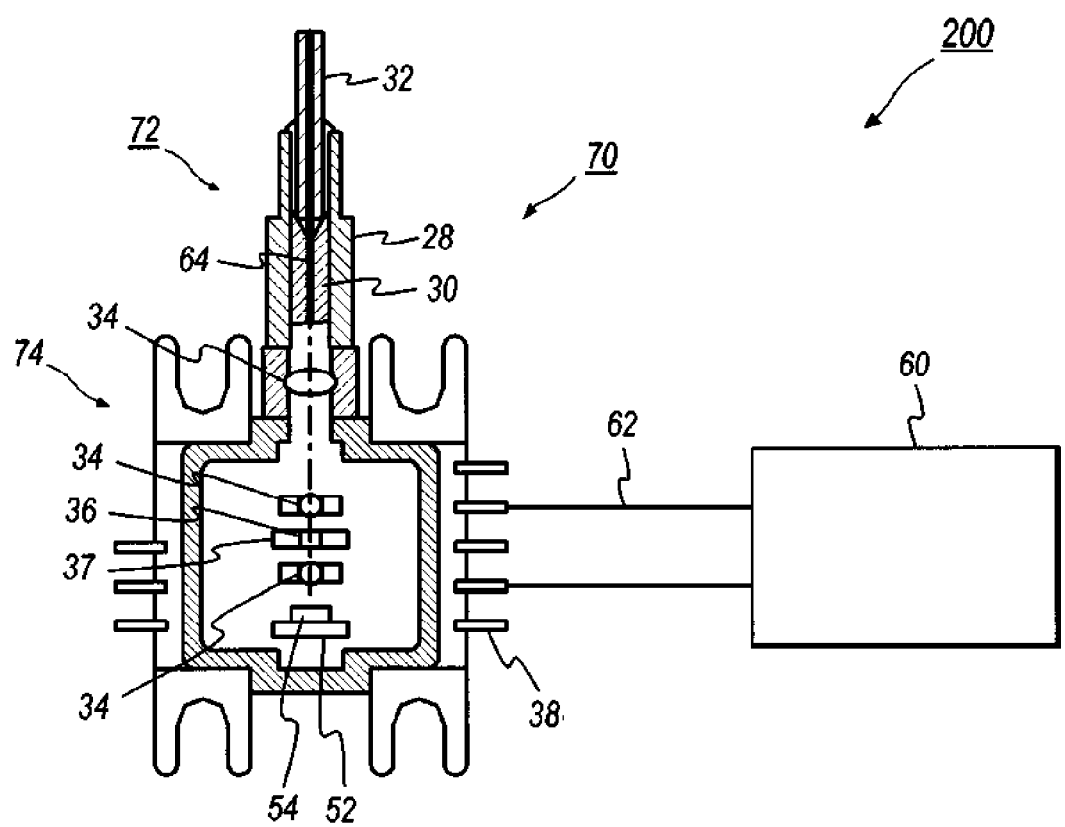
FIG. 7 schematically shows an optical receiver according to another embodiment of the present invention.

The second embodiment according to the present invention installs the SOA element and the PD in a single package. FIG. 7 schematically illustrates another optical receiver 200 according to the second embodiment of the invention. The optical receiver 200 primarily includes an integrated module 70 and the controller 60, where the integrated module 70 includes the input coupling unit 72 and the optical device 74 installing the SOA element 36 and the PD 54.

The input coupling unit 72, same as those of aforementioned unit 22, or another unit 42, fixes the ferrule 30 within the sleeve 28, where the ferrule secures the optical fiber in a center thereof.

The optical device 74 installs the lenses 34, the SOA element 36 and the PD 54 therein. The SOA element 36 is mounted on the carrier 37. One of lenses 34 put behind the SOA element 36 couples the PD 54 optically with the SOA element 36. Two terminals of the SOA element 36 and two terminals of the PD 54 are electrically coupled with respective lead terminals of the optical device 74.

Similar to the aforementioned embodiment, an optical filter put between the SOA element 36 and the PD 54, or an optical isolator put therebetween, is effective to reduce optical noises and suppress the degradation of the performance of the optical receiver 200.

The controller 60 provides the architecture same as those shown in FIG. 5, and performs the process described in FIG. 6. Details of the process shown in FIG. 6 are omitted. The light provided from the optical fiber 64 is received by the PD 54 after it is amplified by the SOA element 36. The second embodiment of FIG. 7 installs the SOA element 36 and the PD 54 within the single package. Even in such an arrangement, the SOA element 36 may detect the magnitude of the incoming light from the optical fiber and determine the amplitude of the driving current based on thus detected magnitude of the incoming light.

The outgoing light emitted from the SOA element 36 optically couples with the PD 54 without entering the optical fiber because the PD 54 is commonly installed within the optical device 74, which means that the optical loss due to the optical fiber connecting the amplifying unit 24 with the PD module 40 may be eliminated.

Third Embodiment

Figure 8:
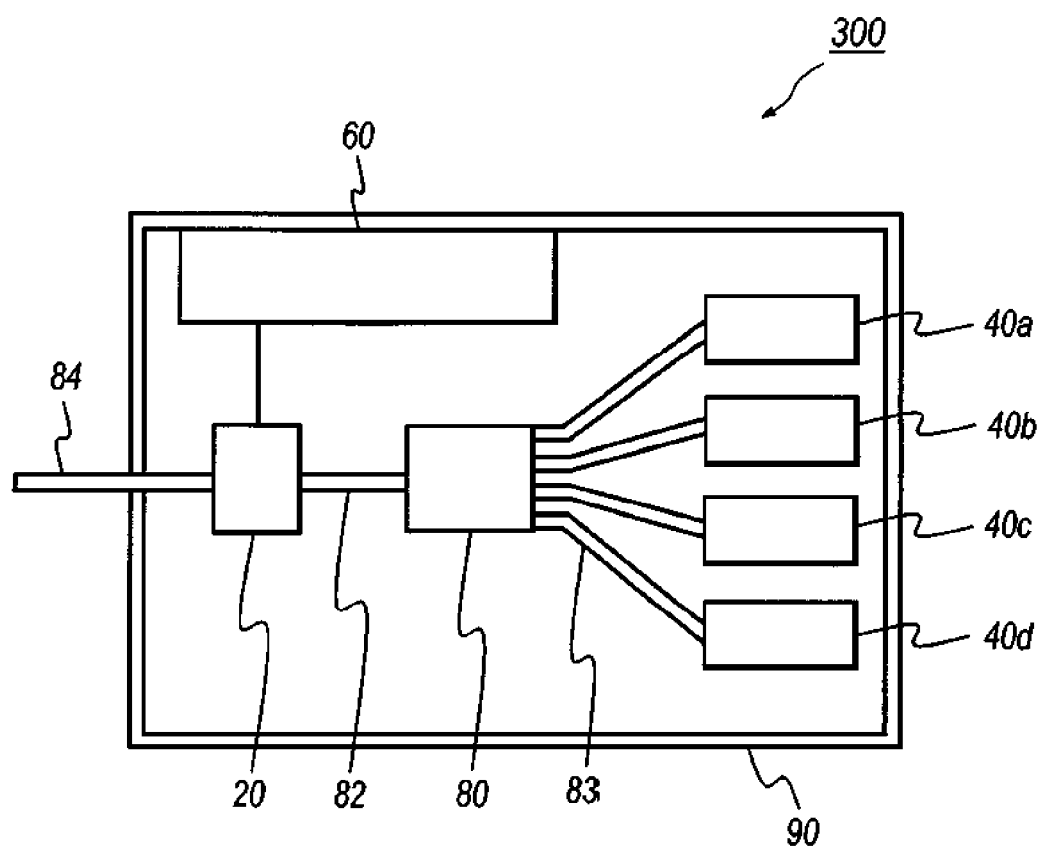
FIG. 8 schematically shows an optical receiver according to still another embodiment of the present invention, where the optical receiver is applicable to the wavelength division multiplexing system.

Another embodiment according to the present invention relates to an optical module able to receive a plurality of optical signals. FIG. 8 schematically illustrates a functional block diagram of the optical module 300 of the third embodiment. The optical module 300 shown in FIG. 8 provides four (4) channels of the optical receivers each receiving respective optical signals. However, the optical module 300 of the present invention is not restricted to the arrangement with the four receiving channels shown in FIG. 8; for instance, the optical module 300 provides 8 channels, and so on.

The optical module 300 of the third embodiment includes, within a housing 90 thereof, an SOA module 20, an optical de-multiplexer 80, four PD modules, 40a to 40d, and a controller 60. The SOA module 20 is coupled with an external optical fiber 84 and an internal optical fiber 82. The optical de-multiplexer 80 is coupled with the SOA module 20 through the internal fiber 82, and respective PD modules, 40a to 40d, through other inner fibers 83. The controller 60 has a function substantially same as those of the aforementioned controllers 60 of the first and second embodiments to execute steps shown in FIG. 6.

The light incoming from the external fiber 84 is a type of the wavelength multiplexed light, and divided into four optical beams depending on the wavelengths thereof by the optical de-multiplexer 80. The divided optical beams are detected by respective PD modules, 40a to 40d. Even in such an arrangement of the optical module 300, the SOA module 20 may detect the magnitude of the incoming light with a plurality of optical signals, and determine the gain of the SOA element based on thus detected magnitude of the optical signal, which eliminates the degradation of the quality of the optical signals, and of the PD modules, 40a to 40d.

When the incoming light received by the SOA element 36 contains four signals each having a specific wavelength different from others, each of optical channels shows a specific performance different from others. That is, the conversion gain from the optical signal into an electrical signal varies in respective optical channels. In order to make the magnitude of the optical signals even within a preset range for respective PD modules, 40a to 40d; the magnitude of the outgoing light output from the SOA module 20 is necessary to be further arranged. For instance, when the input range for the PD module 40 is in 10 dB, the magnitude of the outgoing light from the SOA module 20 is necessary to be within 10 dB in the first embodiment shown in FIG. 5. However, in the third embodiment shown in FIG. 8, the PD modules, 40a to 40d, have the input range within 10 dB, and the SOA module 20 in the gain thereof shows the variation against the wavelength of 1 dB, the magnitude of the outgoing light from the SOA module 20 is necessary to be set within 7 dB. Thus, the optical module able to receive an optical signal containing a plurality of signal channels each having specific wavelengths is necessary to set the magnitude of the outgoing light from the SOA module 20 to be further narrower range. The feedback control shown in FIG. 6 for the SOA module 20 becomes effective.

Fourth Embodiment

The fourth embodiment according to the present invention has an arrangement similar to the first and second embodiments, that is, the optical receiver provides the SOA module and the PD module without any monitor PDs. The PD module receives the outgoing light output from the SOA module. However, the fourth embodiment decides the driving current for the SOA element based on the output of the PD module such that the outgoing light output from the SOA module shows a magnitude in a preset range.

Figure 9:
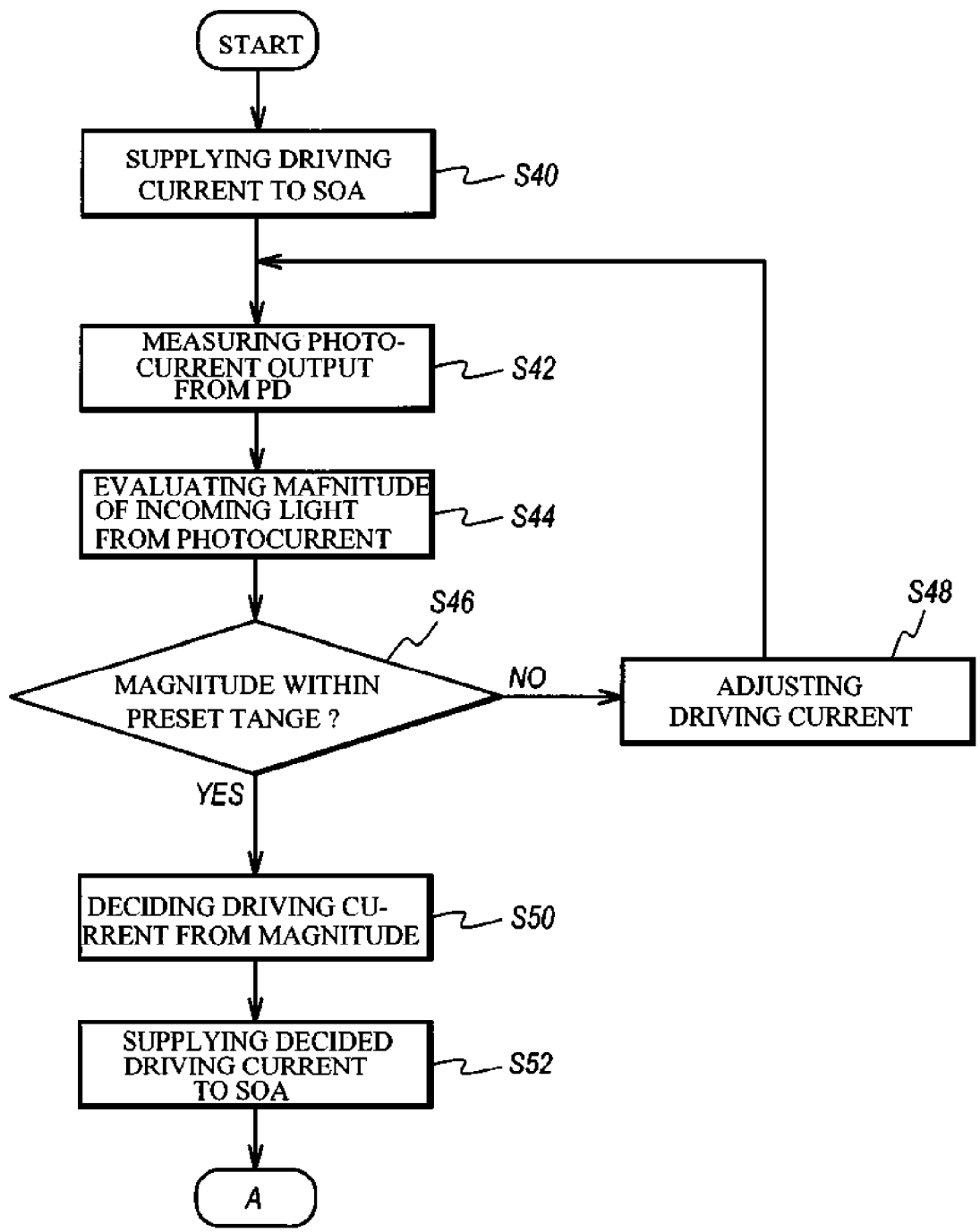
FIG. 9 is a flow chard to control an optical communication system according to still another embodiment of the invention.

An algorithm to control the optical receiver according to the fourth embodiment will be described. FIG. 9 shows a flowchart to control the optical receiver according to the fourth embodiment. The algorithm first performs the initialization where the SOA element 36 receives a monitor light provided from a transmitter, where the monitor light has a magnitude substantially equal to the magnitude of the light practically transmitted during the communication. The monitor light is independent of the modulation.

The algorithm performs the initialization of steps S40 to S52 shown in FIG. 9. That is, the controller 60 provides a preset initial current to the SOA element 36 as the SOA element 36 practically receives the monitor light provided from the optical fiber 64. The initial driving current may be zero; that is a zero-bias is supplied to the SOA element 36. The monitor light provided from the optical fiber 64 passes through, or amplified by, the SOA element 36 to enter the PD 54. The PD 54 generates a photocurrent depending on the magnitude of the monitor light at the PD 54. The controller 60 detects this photocurrent generated by the PD 54.

The controller 60 next evaluates based on thus detected photocurrent the magnitude of the outgoing light output from the SOA element 36 at step S44. Preparing a look-up table co-relating the photocurrent generated by the PD 54 with the magnitude of the light, which is similar to that shown in FIG. 3B, in advance to the practical operation of the optical receiver, the controller 60 may evaluate the magnitude of the light received thereby as referring to this table.

The controller compares thus evaluated magnitude of the light with a target range at step S46, where the target range is preferably an optimum range for the PD 54. When the evaluated magnitude of the light is out of the target range, in the case "NO" in FIG. 9, the controller 60 adjusts the current provided to the SOA element 36 at step S48. In an example, begging from the zero initial current supplied to the SOA element 36, steps from S42 to S48 are iterated until the evaluated magnitude of the light entering the PD 54 falls within the target range. During the iteration of steps from S42 to S48, the increment width of the current is preferably varied, that is, the current is first increased by a step relatively wider, then, by another step relatively narrower to accelerate the convergence of the iteration process. Moreover, in a case when the evaluated magnitude exceeds the target range, the current is decreased.

Finally, the evaluated magnitude of the light falls within the target range, the controller 60 decides the driving current as the current just provided to the SOA element 36 at step S50, and to keep the driving current in this value at step S52.

Then, the practical communication is started. The controller 60 first provides the current thus determined in the initialization to the SOA element 36 and keeps the driving current in this value. Under such a condition, the signal light transmitted from the transmitter through the optical fiber 64 is amplified by the SOA element 36 to a magnitude adequate to the PD 54, and the PD 54 reliably receives thus amplified signal light and generates the photocurrent to be processed. When the optical transmitter is replaced, for instance, to a distant place, or to another apparatus with different performances, the initialization from steps S40 to S52 to determine the driving current for the SOA element 36 such that the amplified light has a magnitude optimum to the PD 54 may be performed again.

Thus, the fourth embodiment detects the magnitude of the outgoing light output from the SOA element 36 by the PD 54, and determines the driving current supplied to the SOA element 36 based on thus detected magnitude, which enables the feedback control of the SOA element 36 without providing any monitor PDs and suppressed the reduction of the performance of the optical receiver. The fourth embodiment described above assumes the arrangement of the optical receiver 100 shown in FIG. 5. However, the algorithm according to the fourth embodiment may be applicable to the arrangement of the optical receiver shown in FIGS. 7 and 8.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method to control an optical receiver implemented with a semiconductor optical amplifier (SOA) that includes an active layer put between semiconductor layers each having a conduction type different from others, the method comprising steps of:
    detecting a magnitude of light incoming to the SOA by operating the SOA in a photodiode mode by supplying a reverse bias or a zero bias to the SOA;
    calculating a forward bias by using the magnitude by a controller; and
    driving the SOA by supplying the forward bias to the SOA after the detecting the magnitude of the light incoming to the SOA,
    wherein the reverse bias or the zero bias supplied to the SOA and the forward bias supplied to the SOA are supplied to a same gain region of the SOA.

2. The method of claim 1, wherein the incoming light contains a plurality of optical signals each having a specific wavelength different from others.

3. The method of claim 2, wherein the specific wavelengths of respective optical signals are within a 1.3 μm band.

4. The method of claim 1, wherein the light incoming to the SOA provides a wavelength contained in 1.3 μm band.

5. The method of claim 1, wherein the SOA is installed in an SOA module and a photodiode for receiving a light output from the SOA is installed in a PD module distinguishable from the SOA module.

6. The method of claim 5, wherein the SOA module and the PD module are optically coupled with an optical fiber having a length less than 1 m.

7. The method of claim 1, wherein the SOA and a photodiode for receiving a light output from the SOA are commonly installed in a housing.

8. A method to control an optical communication between an optical transmitter and an optical receiver coupled with the optical transmitter through an optical fiber, wherein the optical receiver includes a semiconductor optical amplifier (SOA) in upstream of a semiconductor photodiode (PD), the method comprising steps of:
    operating the SOA in a photodiode mode by supplying a reverse bias or a zero bias to the SOA to generate a photocurrent as receiving light incoming from the optical transmitter through the optical fiber;
    evaluating a magnitude of the incoming light from the photocurrent;
    calculating a forward bias by using the magnitude by a controller; and
    supplying the forward bias to the SOA after the evaluating the magnitude of the incoming light, the forward bias having a strength determined such that light outgoing from the SOA has a magnitude within a preset range,
    wherein the reverse bias or the zero bias supplied to the SOA and the forward bias supplied to the SOA are supplied to a same gain region of the SOA.

9. The method of claim 8, wherein the preset range of the outgoing light is determined such that the PD generates a photocurrent adequately by receiving the outgoing light.

10. The method of claim 8, wherein the forward bias supplied to the SOA is kept until the optical transmitter is replaced.

* * * * *